United States Patent [19]

Mers et al.

[11] Patent Number: 4,833,576
[45] Date of Patent: May 23, 1989

[54] ALUMINUM PHOSPHATE CEMENT COMPOSITIONS AND LAMP ASSEMBLIES CONTAINING SAME

[75] Inventors: Catherine Mers, Willoughby, Ohio; Clark D. Nelson, Mattoon, Ill.; Vito J. Arsena, Highland Heights; Mary S. Jaffe, Cleveland Heights, both of Ohio

[73] Assignee: General Electric Company, Schenectady, N.Y.

[21] Appl. No.: 101,929

[22] Filed: Sep. 29, 1987

[51] Int. Cl.$^4$ ............................................. H01R 33/00
[52] U.S. Cl. .................................. 362/226; 106/104; 362/263
[58] Field of Search ................ 362/226, 263; 106/85, 106/104, 105; 501/111, 127

[56] References Cited

U.S. PATENT DOCUMENTS

| 3,658,563 | 4/1972 | Washio et al. | 501/111 X |
| 3,725,698 | 4/1973 | Craig | 362/226 |
| 4,021,659 | 5/1977 | Wiley | 240/41.36 |
| 4,262,055 | 4/1981 | Russell et al. | 501/111 X |
| 4,366,255 | 12/1982 | Lankard | 106/104 X |
| 4,390,935 | 6/1983 | Audesse et al. | 362/226 X |
| 4,394,174 | 7/1983 | Tomic | 106/85 |
| 4,395,387 | 7/1983 | Goltz et al. | 423/305 |
| 4,403,276 | 9/1983 | Blaisdell | 362/263 X |
| 4,440,865 | 4/1984 | Salazar | 106/85 X |
| 4,522,926 | 6/1985 | Felice | 106/84 X |
| 4,608,624 | 8/1986 | Blaisdell et al. | 362/226 |

Primary Examiner—Ira S. Lazarus
Assistant Examiner—Peggy Neils
Attorney, Agent, or Firm—Edward M. Corcoran; Stanley C. Corwin; Fred Jacob

[57] ABSTRACT

This invention relates to aluminum phosphate refractory cement compositions which comprise a mixture of aluminum phosphate containing excess phosphoric acid, relatively small particle size alumina and a mixture of relatively medium and coarse particle size inert filler materials. This cement is useful for cementing tungsten-halogen lamps into glass reflectors. The aluminum phosphate is formed with an excess of phosphoric acid which reacts with the alumina when the cement is baked at elevated temperatures.

22 Claims, 1 Drawing Sheet

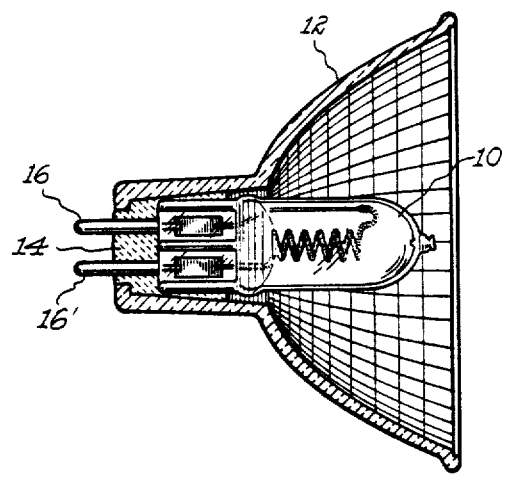

ALUMINUM PHOSPHATE CEMENT COMPOSITIONS AND LAMP ASSEMBLIES CONTAINING SAME

BACKGROUND OF THE INVENTION

1. Field of the Invention

This invention relates to aluminum phosphate refractory cement compositions. More particularly, this invention relates to aluminum phosphate refractory cement compositions useful for cementing tungsten-halogen lamps into glass reflectors wherein the cement composition comprises a mixture of aluminum phosphate containing excess phosphoric acid, relatively small particle size alumina and a mixture of relatively medium and coarse particle size filler.

2. Background of the Disclosure

High intensity linear types of lamps, such as the well-known tungsten halogen lamps, are being used in ever greater numbers for a variety of commercial and consumer applications. A typical lamp of this type is disclosed in U.S. Pat. No. 4,021,659 which is the pioneer patent for a particular reflector-lamp assembly wherein the lamp is a tungsten halogen lamp having a quartz envelope which is cemented into an all glass reflector. The cement must be a refractory cement, because the temperature of the lamp envelope at the seal area which is cemented into a reflector often exceeds 350° C. In addition to being resistant to such high temperatures, the cement must also be electrically non-conducting, have the proper thermal conductivity and have a thermal coefficient of expansion which matches that of the reflector as closely as possible. One type of refractory cement that has been successfully used commercially for this application has been a silica-reinforced potassium silicate type of cement. Although these cements have good heat resistance with low thermal and electrical conductivity, their use with such lamp-reflector assemblies can result in corrosion problems in storage. Such cement compositions are alkaline, having a pH above 7, and, under very humid conditions and over extended periods of time, their use has resulted in corrosion of the molybdenum inlead construction in the pinch seal area of the lamp envelope which results in an inoperative lamp. Further, such cements gradually lose their strength over a period of time. Consequently, a need exists for a cement that will not adversely effect the reflector-lamp assembly.

SUMMARY OF THE INVENTION

The present invention relates to an aluminum phosphate cement composition comprising a mixture of (i) aluminum phosphate which contains excess phosphoric acid, (ii) relatively small particle size alumina particles and (iii) a mixture of relatively medium and coarse particle size inert, refactory filler material. This cement is prepared by mixing an aqueous aluminum phosphate solution containing excess phosphoric acid with an aggregate mixture of said alumina particles and said inert filler particles to form a paste, followed by heating said paste at a temperature of at least about 250° C. for a time sufficient to form said cement. This cement composition is a bondable cement composition which has been found useful for cementing tungsten-halogen incandescent lamps having a vitreous envelope into glass reflectors to produce a lamp-reflector assembly of the type disclosed in U.S. Pat. No. 4,021,659. The aluminum phosphate solution is formed by reacting aluminum hydroxide with phosphoric acid. The aluminum phosphate solution will contain excess phosphoric acid so that the atomic ratio of phosphorus to aluminum is greater than about 3.

BRIEF DESCRIPTION OF THE DRAWING

The FIGURE is a view of a glass reflector and tungsten halogen lamp assembly wherein the lamp is cemented into the reflector employing the aluminum phosphate cement of the present invention.

DETAILED DESCRIPTION

As set forth above, the present invention relates to an aluminum phosphate cement composition comprising a mixture of (i) aluminum phosphate which contains excess phosphoric acid (ii) relatively small particle size alumina particles and (iii) a mixture of relatively medium and coarse particle size inert refractory filler material. This cement is prepared by mixing an aqueous aluminum phosphate solution containing excess phosphoric acid with an aggregate mixture of said alumina and said inert filler material to form a paste or slurry, followed by heating said paste or slurry at a temperature of at least about 250° C. for a time sufficient to form said cement.

In preparing the aluminum phosphate solution, aluminum hydroxide is reacted with phosphoric acid merely by mixing the phosphoric acid and aluminum hydroxide. It is preferred that the acid employed for this reaction be chilled to a temperature below room temperature (i.e., about 40° F.) due to the exothermic nature of the reaction. This helps to control the reaction and to avoid clumping of the Al(OH)$_3$. The phosphoric acid may be employed in the form of 85% phosphoric acid which is commercially available. Further, the phosphoric acid may be mixed with water prior to reacting same with the aluminum hydroxide. Alternatively, the aluminum hydroxide may be slurried in water and the cool phosphoric acid added to the so-formed slurry. As a practical matter it has beeen found convenient to dilute the cold phosphoric acid with water and then add the aluminum hydroxide either in the form of powder or in the form of an aqueous slurry slowly to the diluted acid, with aggitation, to disperse the Al(OH)$_3$ and then slowly warm the dispersion to form the aluminum phosphate solution. It will be appreciated that the particular method of forming the aluminum phosphate solution is left to the convenience of the practicioner.

As set forth above, the aluminum phosphate cement of the present invention is formed employing an aluminum phosphate solution containing excess phosphoric acid. It should be understood and will be apparent to those skilled in the art that the aluminum hydroxide does not necessarily have to be reacted with the phosphoric acid in the presence of excess phosphoric acid. The excess phosphoric acid may be added to the aluminum phosphate solution. By excess phosphoric acid is meant phosphoric acid in an amount such that the atomic or mole ratio of phosphorus or phosphate to aluminum exceeds 3. In general, the excess phosphoric acid may range from about 10–30 mole percent and more preferably from 12–20 percent. An optimum ratio of phosphorus from the phosphoric acid to the aluminum of the aluminum hydroxide has been found to be about 3.6.

Thus, the aluminum hydroxide may be reacted with phosphoric acid in the presence of such an excess amount of acid. Alternately, the aluminum hydroxide may be reacted with the phosphoric acid in an amount such that the ratio of phosphoruc from the acid to the aluminum in the aluminum hydroxide is 3. The excess phosphoric acid may then be subsequently incorporated into the aluminum phosphate solution or may be mixed with one or more of the other ingredients of the composition which will be added to or to which will be added the aluminum phosphate solution. While not wishing to be held to any particular theory, it is believed that the excess phosphoric acid reacts with the alumina particles when at elevated temperature. If to little acid is employed in the cement composition of the present invention, the pre-cement paste or slurry will be unstable as reflected in low cement strength and decreased shelf life. On the other hand, if too much phosphoric acid is employed the reaction time at elevated temperature required to form the cement will increase excessively.

The aluminum phosphate solution will be slurried with the alumina particles and the mixture of coarse and fine particle size inert filler material. This may be accomplished in any convenient manner. The particular mixing sequence employed is not believed to be critical to forming the final slurry or paste which is subsequently heated to form the cement. Thus the particulate alumina and filler materials may be premixed in a dry state and added, with aggitation, to the aluminum phosphate solution to form a paste or slurry. Alternatively, the aluminum phosphate solution may be added to one or more of the particulate materials. Those skilled in the art will appreciate that the rheology of the final slurry or paste will, of course, be determined by the amount of excess acid present, the amount of water present, the amount of the aluminum phosphate solution present with respect to the powdered or particulate materials, the relative particle size of the powdered materials, etc. Thus, the actual amounts of the various ingredients with respect to eachother employed in forming the aluminum phosphate cement of this invention may vary. The following Table, based on 100 volumes of total slurry or paste composition, illustrates the general and preferred ranges of the various ingredients to each other employed in forming the cement composition of this invention.

|  | Parts by Volume | |
| --- | --- | --- |
|  | General | Preferred |
| Aluminum phosphate solution* | 10–25 | 12–20 |
| fine size particles ($Al_2O_3$) | 4–15 | 4–8 |
| medium size particles | 5–30 | 10–25 |
| coarse size particles | 40–75 | 50–70 |
| water | 15–75 | 25–60 |

Notes:
*Based on reacting Al(OH)$_3$ with 85% H$_3$PO$_4$ in aqueous solution with no added H$_2$O.

In forming the cement composition of the present invention, the aluminum phosphate solution will be incorporated or mixed with relatively fine, medium and coarse particle size materials. The alumina will preferably comprise all or substantially all of the fine particle size material, although a small portion (i.e. less than about 20 volume percent) may be comprised of medium size particles. The broad and preferred particle size ranges expressed as mean particle size for the fine, medium and coarse particles are set forth in the Table below.

|  | Mean Particle Size in Microns | |
| --- | --- | --- |
|  | Broad | Preferred |
| Coarse size particles | 16–46 | 18–42 |
| Medium size particles | 7–15 | 10–12 |
| Fine size particles | 1–4 | 1–2 |

It is particuluarly preferred that at least the medium and coarse particle size materials be generally spherical and not be in the form of needle-like or plate-like shapes. A more spherical particle size is important in achieving a more densely close-packed particle structure which has been found to be particularly useful in the cement composition of the present invention. The medium and coarse particle size filler materials should be inert in the sense that they do not react at room temperature with the other ingredients of the slurry or paste from which the cement is formed. If the cement is to be employed in cementing a quartz lamp or quartz containing article into a reflector or other fixture, it is also preferred that all of the ingredients of the cement composition be relatively low in alkali metal content such as sodium. In such applications it is preferred that the sodium content be below about 2 wt. % of the final cement.

The filler materials should also be refractory in the sense that they are not affected by the relatively high temperatures of 350°–600° C. which may be encountered in some lamp applications. The filler materials must also be relatively electrically non-conducting. The particular choice of filler materials employed will be determined by a number of factors, among which includes cost and thermal conductivity. When a cement composition of the present invention is to be used to cement a lamp such as a high intensity quartz-halogen lamp into an all glass reflector, the choice of the inert filler materials will be selected so as to achieve thermal conductivity characteristics of the cement which do not result in excessive thermal stresses to the reflector when the lamp is energized which would ultimately result in cracking of the glass reflector. Thus a balance of thermal conductivity is required. If the thermal conductivity of the cement is too low, the temperature of the seal area of the lamp will be too high. Conversely, if the thermal conductivity is too high the glass reflector may crack. Among such materials that have been found useful in forming the cement composition of the present invention are included spheres made up of alumina silicate materials, solid and hollow glass spheres having a relatively low alkali metal content and barium titanate. Barium titanate has been found to be useful for adjusting the thermal conductivity of the final cement composition. However, it is understood to those skilled in the art that other inert filler materials may be employed in the spirit of the present invention.

Although it is believed that phosphoric acid reacts with alumina at temperatures as low as about 200° C. it is preferred that the paste or slurry of the present invention be cured at a temperature of at least about 240° C. in order to achieve a cement having satisfactory strength and which achieves a cure in a reasonable period of time. Thus, the cure temperature for the cement composition of the present invention may broadly range from about 240° to about 380° C. and more preferably from about 280°–340° C. The optimum temperature will depend upon the particular composition used. The cure time will be greater than about 5 minutes and preferably greater than about 7 minutes. Cement compositions of the present invention have been cured employing cure times ranging from about 5-20 minutes and preferably about 7-15 minutes at these temperatures.

DESCRIPTION OF A PREFERRED EMBODIMENT

Referring to the Figure, a high intensity type tungsten-halogen lamp 10 having a quartz envelope is shown cemented into glass reflector 12 with an aluminum phosphate cement composition 14 of the present invention. Ferrules 16 and 16' extend from the end of the lamp through the cement composition. The lamp is cemented into the reflector employing a procedure which comprises first placing the lamp into the elongated rear portion of the reflector and securing same therein by introducing a first portion of cement paste or slurry into said rear portion using a syringe type of device. The initial fill of cement is then dried for about 1 minute in flowing hot air to dry the paste and achieve a slight degree of cure sufficient to set up the cement enough to permit further handling of the lamp-reflector assembly without dislodging or misaligning the lamp. A second fill of the same cement is applied to completely fill up the nose portion of the reflector. The assembly is placed in an oven at 110° C. and then heated up to a temperature of between 300°-325° C. over a time period of about 30 minutes and held at said 300°-325° C. temperature for a period of time of from 7-15 minutes in order to cure the cement. The cement formulation employed is set forth in the Table below.

| | Vol. % | Wt. % | mean particle size, microns |
|---|---|---|---|
| Aluminum phosphate solution (basis of 85% H3PO4 with no water added) | 15.8 | 11.3 | |
| Zeeospheres 850 (coarse filler) | 23.6 | 18.8 | 42 |
| Zeeospheres 800 (medium filler) | 47.2 | 37.7 | 12 |
| Barium titanate (medium filler) | 8.4 | 24.1 | 10 |
| Fired alumina water (fine particle size) | 5.1 | 8.1 | 2 |
| | 100% | 100% | |

Water is added to the above formulation in an amount of 49 folumes of water per 100 volumes of paste or 19.6 parts by weight per 100 parts by weight of paste.

The aluminum phosphate solution is prepared by diluting chilled, 85% phosphoric acid with chilled, deionized water to which is added aluminum hydroxide with the resultant mixture agitated until the aluminum hydroxide is dispersed. The solution is then permitted to warm up to room temperature before being mixed with the other ingredients of the cement in order to effect reaction of the acid with the aluminum hydroxide. The following Table gives the components of the aluminum phosphate solution.

| | Wt. % | Vol. % |
|---|---|---|
| Al(OH)3 | 12.6 | 8.1 |
| 85% H3PO4 | 67.3 | 60.8 |
| H2O | 20.1 | 31.1 |

To this solution is added the mixture of the particulate materials set forth in the immediately preceeding Table to form the cement paste which is used to cement the lamp into the reflector.

The foregoing was intended to be illustrative of a preferred embodiment of the present invention. The invention will be further understood by reference to the Examples below.

EXAMPLES

Reflector Stress Measurement

Different cement compositions were tested for their relative thermal conductivities by observing the thermal stresses produced in all-glass reflectors of lamp-reflector assemblies of the type disclosed in the Figure (and in U.S. Pat. No. 4,021,659). For these tests, the lamp was a tungsten-halogen 360 watt type having a quartz envelope. The lamp burning environment contained a fan which constantly forced air over the lamps while they were burning and after they were turned off. After the lamps were turned off, the glass reflectors cooled quickly and unevenly by the air flow produced by the fan, which produced thermal stresses, both in tension and in compression, in the glass reflectors with the on-off cycling of the lamp. These thermal stresses sometimes caused the reflectors to fracture with the magnitude of the stress dependent on how far into the strain range the glass was taken and how unevenly the glass was cooled. Thus the thermal conductivity of the cement is relatively important.

The lamps were cycled for 7½ minutes on and 7½ minutes off for 200 cycles, after which they were removed from their reflectors. The reflector nose was saw cut at approximately the top of the cement line and the saw cut piece placed face-up in immersion fluid and examined in a polyscope. The amount of tensile stress built up along the inside of the nose surface was calculated from the following formula:

$$\text{Stress (psi)} = \frac{17.3 \times \theta}{t \times B}$$

$\theta$ = Degrees of analyzer roatation
$B$ = Stress optical coefficient
$t$ = Viewed optical path length (inches)

EXAMPLE 1

In this experiment, a cement composition was prepared following the procedure described under DESCRIPTION OF THE PREFERRED EMBODIMENT with the cement composition being as set forth in the Table below.

| | Vol. % | Wt. % | mean particle size, microns |
|---|---|---|---|
| Aluminum phosphate solution (basis of no water added) | 14.8 | 11.3 | |
| Zeeospheres 850 (coarse filler) | 66.0 | 56.4 | 42 |
| Fired Al2O3 (medium particle size) | 14.4 | 24.2 | 11 |
| Fired Al2O3 (Fine particle size) | 4.8 | 8.1 | 2 |
| | 100 | 100 | |

H2O was added to above in an amount of 58.1 volumes per 100 volumes of above or 24.9 parts by wt. per 100 parts by wt. of above.

The composition of the aluminum phosphate solution (without the water) was the same as that given under the DESCRIPTION OF THE PREFERRED EMBODIMENT and was prepared in the same manner. The Zeeospheres are hollow silica-alumina ceramic spheres available from Zeelan Industries, Inc. of St. Paul, Minn. The fired alumina was obtained by firing aluminum hydroxide.

The so-formed pre-cement paste was employed to cement twenty of the 350 watt lamps into all glass reflectors as shown in the Figure employing the two-step process of injecting cement followed by curing set forth under DETAILED DESCRIPTION. Accelerated life tests were conducted employing the procedure set forth above for the stress test, but with cycles of 15 minutes on ans 15 minutes off for a total burning time of 75 hours or total test time of about 150 hours.

The results of the life test were that the reflectors had cracked in 18 out of 20 of the reflector-lamp assemblies. Stress tests were also conducted and the stress build up in the reflectors had a value of about 290 psi.

EXAMPLE 2

This example was similar to Example 1, except that the composition of the cement paste was that set forth in the Table below.

|  | Vol. % | Wt. % | mean particle size, microns |
|---|---|---|---|
| Aluminum phosphate solution (basis of no added water) | 15.8 | 11.3 | |
| Zeeospheres 850 (coarse filler) | 23.6 | 18.8 | 42 |
| Zeeospheres 800 (medium filler) | 47.2 | 37.7 | 12 |
| Barium titanate (medium filler) | 8.4 | 24.1 | 10 |
| Fired Alumina (fine particle size) | 5.1 | | |
| | 100.0% | | |

The above composition contained water in an amount of 49.1 volumes of water per 100 volumes of above or 19.6 parts of water by weight per 100 parts by weight of above.

This cement paste was used with the same lamps and reflectors and following the same procedure as in Example 1. The results of the life tests with 20 lamps were that 15% of the reflectors cracked. The stress level was not measured.

EXAMPLE 3

This example was also similar to that of Example 1 exept that the cement paste had the following composition.

|  | Vol. % | Wt. % | mean particle size, microns |
|---|---|---|---|
| Aluminum phosphate solution (basis of no added water) | 17.8 | 11.2 | |
| Potters 3000 E Glass Spheres (coarse filler) | 65.1 | 57.0 | 30 |
| Barium titanate (medium filler) | 11.3 | 23.9 | 10 |
| Fired Alumina (fine size) | 5.7 | 8.0 | 2 |
| | 99.9 | 100.1 | |

Added H$_2$O was 28.4 volumes per 100 volumes of above

The glass spheres are solid glass spheres and were obtained from Potters Industries, Inc. of Hasbrouck Hts., N.J.

In this experiment, less than 3% of the glass reflectors cracked in the life test. Stress build-up was determined in the stress test to be on the order of about 50 psi.

What is claimed is:

1. An aluminum phosphate cement composition comprising a reaction product of a mixture, on a parts by volume basis based on 100 volumes of mixture, of (i) 10-25 parts of an aqueous solution of aluminum phosphate taken or expressed as the total reaction product of reacting aluminum hydroxide with 85% phosphoric with no added water and containing excess phosphoric acid in an amount such that the atomic or mole ratio of the phosphorus from said aluminum phosphate and said phosphoric acid to the aluminum in said aluminum phosphate exceeds 3 by an amount of from 10-30 mole %, (ii) 4-15 parts of relatively small particle size alumina particles, (iii) 5-30 parts of relatively medium particle size inert refractory filler material, and (iv) 40-75 parts of relatively coarse particle size inert refractory filler material and wherein said reaction product is obtained by heating said mixture at a temperature of at least about 240° C.

2. The composition of claim 1 wherein said alumina comprises fired alumina.

3. The composition of claim 2 comprising (i) alumina having a mean particle size ranging between about 1-4 microns, (ii) medium size inert filler particles having a mean particle size ranging between about 7-15 microns and (iii) coarse particle size inert filler particles having a mean particle size ranging between about 16-46 microns.

4. An aluminum phosphate cement composition comprising a mixture of (i) aluminum phosphate, (ii) relatively small particle size alumina and (iii) a mixture of relatively medium and coarse particle size, inert, refractory filler material, wherein said cement is prepared by mixing, on a parts by volume basis based on 100 volumes of cement slurry or paste, about 10-25 parts of an aqueous aluminum phosphate solution with an aggregate mixture of said alumina and said inert filler material to form a slurry or paste, followed by heating said so-formed slurry or paste at a temperature of at least about 250° C. for a time sufficient to form said cement, wherein said paste or slurry contains sufficient phosphoric acid so as to provide phosphorus in an amount of 10-30 mole % in excess of that amount sufficient to insure that the mole ratio of the combined phosphorus in the phosphate of the aluminum phosphate and in the phosphoric acid to the aluminum of the aluminum phosphate is 3 and wherein the amounts of the various ingredients present in said slurry on a parts by volume basis range from about 10-25 parts of aluminum phosphate solution, from about 4-15 parts of alumina, from about 5-30 parts of medium size filler and from about 40-75 parts of coarse size filler, and wherein said aluminum phosphate solution is based on or expressed as the reaction product of aluminum hydroxide with an 85% aqueous solution of H₃PO₄.

5. The composition of claim 4 additionally containing from about 15–75 parts of added water.

6. The composition of claim 5 comprising (i) alumina having a mean particle size ranging between about 1–4 microns, (ii) medium size filler particles having a mean particle size ranging between about 7–15 microns and (iii) coarse particle size filler particles having a mean particle size ranging between about 16–46 microns.

7. A reflector and lamp combination comprising (a) a glass reflector member having a front reflecting portion terminating in an elongated hollow cavity portion which protrudes rearwardly from said reflector member and (b) a tungsten-halogen lamp permanently secured in said hollow cavity portion with an aluminum phosphate cement comprising a reaction product of a mixture of (i) an aqueous solution of aluminum phosphate containing excess phosphoric acid in an amount such that the atomic or mole ratio of the phosphorus from said aluminum phosphate and said phosphoric acid to the aluminum in said aluminum phosphate exceeds 3, (ii) relatively small particle size alumina particles and (iii) a mixture of relatively medium and coarse particle size inert refractory filler material, wherein said reaction product is obtained by heating said mixture at a temperature of at least about 240° C., wherein said mixture comprises, on a parts by volume basis based on 100 volumes of mixture, (i) 4–15 parts of said alumina, (ii) 5–30 parts of said medium size filler (iii) 40–75 parts of said coarse size filler, and (iv) 10–25 parts of said aluminum phosphate solution expressed as the total reaction product of reacting aluminum hydroxide with 85% phosphoric acid with no added water and wherein said phosphoric acid is present in said mixture in an amount so as to provide phosphorus of from 10–30 mole % in excess of that required to achieve said mole ratio of 3 of said phosphorus to said aluminum in said aluminum phosphate solution.

8. The combination of claim 7 wherein the cement mixture components comprise (i) said alumina comprising fired alumina having a mean particle size ranging between about 1–4 microns, (ii) said medium size filler particles having a mean particle size ranging between about 7–15 microns and (iii) said coarse particle size filler particles having a mean particle size ranging between about 16–46 microns.

9. An aluminum phosphate cement composition consisting essentially of a mixture of (i) aluminum phosphate, (ii) relatively small particle size alumina and (iii) a mixture of relatively medium and coarse particle size inert, refractory filler material, wherein said cement is prepared by mixing an aqueous aluminum phosphate solution with an aggregate mixture of said alumina and said inert filler material to form a slurry or paste, followed by heating said so-formed slurry or paste at a temperature of at least about 250° C. for a time sufficient to form said cement, wherein said paste or slurry contains phosphoric acid in an amount of 10–30 mole % in excess of that amount sufficient to insure that the mole ratio of phosphate of the aluminum phosphate and phosphoric acid to the aluminum of the aluminum phosphate is 3 and wherein the amounts of the various ingredients present in said slurry on a parts by volume basis range from about 10–25 parts of aluminum phosphate solution, from about 4–15 parts of said medium size inert filler and from about 40–75 parts of said coarse size inert filler, and wherein said aluminum phosphate solution is based on or expressed as the reaction product of aluminum hydroxide with an 85% aqueous solution of H₃PO₄ with no added water.

10. The composition of claim 9 additionally containing from about 15–75 parts of added water.

11. The composition of claim 10 wherein said alumina has a mean particle size ranging between about 1–4 microns, said medium size filler particles have a mean particle size ranging between about 7–15 microns and said coarse particle size filler particles have a mean particle size ranging between about 16–46 microns.

12. The composition of claim 3 containing at least one of hollow glass spheres or barium titanate as said inert filler particles.

13. The composition of claim 1 wherein the sodium content of said cement is less than 2 wt. %.

14. The composition of claim 12 wherein the sodium content of said cement is less than 2 wt. %.

15. The composition of claim 4 wherein said inert filler material comprises at least one component selected from the group consisting of hollow glass spheres, barium titanate and mixture thereof.

16. The composition of claim 15 containing less than 2 wt. % sodium.

17. The composition of claim 6 wherein said inert filler material comprises at least one component selected from the group consisting of hollow glass spheres, barium titanate and mixture thereof.

18. The composition of claim 16 containing less than 2 wt. % sodium.

19. The composition of claim 11 wherein said inert filler material comprises at least one component selected from the group consisting of hollow glass spheres, barium titanate and mixture thereof.

20. The composition of claim 19 containing less than 2 wt. % sodium.

21. The composition of claim 9 wherein said inert filler material comprises at least one component selected from the group consisting of hollow glass spheres, barium titanate and mixture thereof.

22. The composition of claim 21 containing less than 2 wt. % sodium.

* * * * *